United States Patent
Oniduka

(10) Patent No.: US 10,704,547 B2
(45) Date of Patent: Jul. 7, 2020

(54) VOLUME PUMP INCLUDING A BELLOWS AND A SUCTION VALVE AND A DISCHARGE VALVE WHEREIN THE VALVES COMPRISE A VALVE SEAT AND A VALVE BODY AND WHEREIN A FIXED SECTION OF THE VALVE BODY INCLUDES A COMMUNICATING FLOW PATH

(71) Applicant: IWAKI CO., LTD., Tokyo (JP)

(72) Inventor: Toshiki Oniduka, Iruma-gun (JP)

(73) Assignee: IWAKI CO., LTD., Tokyo (JP)

( * ) Notice: Subject to any disclaimer, the term of this patent is extended or adjusted under 35 U.S.C. 154(b) by 301 days.

(21) Appl. No.: 15/553,553

(22) PCT Filed: Mar. 10, 2015

(86) PCT No.: PCT/JP2015/056940
§ 371 (c)(1),
(2) Date: Aug. 24, 2017

(87) PCT Pub. No.: WO2016/143057
PCT Pub. Date: Sep. 15, 2016

(65) Prior Publication Data
US 2018/0051692 A1    Feb. 22, 2018

(51) Int. Cl.
*F04B 53/10*    (2006.01)
*F04B 43/08*    (2006.01)
(Continued)

(52) U.S. Cl.
CPC .......... *F04B 53/1065* (2013.01); *F04B 43/08* (2013.01); *F04B 43/1136* (2013.01);
(Continued)

(58) Field of Classification Search
CPC .............. F04B 53/1065; F04B 43/1136; F04B 43/083; F04B 45/022; F04B 45/033;
(Continued)

(56) References Cited

U.S. PATENT DOCUMENTS 2,833,306 A * 5/1958 Cummings ........... F16K 15/148
137/854
2,859,771 A * 11/1958 Blagg ................. F16K 15/148
137/512.15
(Continued)

FOREIGN PATENT DOCUMENTS

CN     2306334 Y    2/1999
CN   202327259 U   7/2012
(Continued)

OTHER PUBLICATIONS

Sep. 12, 2017 International Preliminary Report on Patentability issued in International Patent Application No. PCT/JP2015/056940.
(Continued)

*Primary Examiner* — Devon C Kramer
*Assistant Examiner* — Benjamin Doyle
(74) *Attorney, Agent, or Firm* — Oliff PLC

(57) ABSTRACT

A volume pump transfers a transfer fluid by expanding and contracting a bellows, and includes: the bellows that is capable of expanding and contracting, and has a bottomed cylindrical shape forming a pump chamber on its inside; a suction valve provided on a suction side of the pump chamber to guide the transfer fluid into the pump chamber; and a discharge valve provided on a discharge side of the pump chamber to discharge the transfer fluid from the pump chamber. The suction valve and the discharge valve each include a valve seat and a valve body. The valve body is configured from a flexible material and has: a fixed section whose positional relationship with the valve seat is fixed; and a valve section that extends in a certain direction between a direction directed from the fixed section to the valve seat and a direction that the transfer fluid moves.

11 Claims, 3 Drawing Sheets

(51) Int. Cl.
*F04B 45/02* (2006.01)
*F16K 15/14* (2006.01)
*F04B 43/113* (2006.01)

(52) U.S. Cl.
CPC .............. *F04B 45/02* (2013.01); *F04B 53/10* (2013.01); *F16K 15/148* (2013.01)

(58) Field of Classification Search
CPC .... F04B 53/106; F04B 39/1033; F16K 15/14; F16K 15/144; F16K 15/148; A61M 2039/2433
USPC .................. 417/253; 137/851, 855, 852, 854
See application file for complete search history.

(56) References Cited

U.S. PATENT DOCUMENTS

| | | | | |
|---|---|---|---|---|
| 3,473,561 A * | 10/1969 | Svenson | ............... | F16K 15/148 137/854 |
| 4,090,818 A | 5/1978 | Hope et al. | | |
| 4,609,006 A * | 9/1986 | Parkison | ................... | E03C 1/04 137/119.04 |
| 5,271,432 A * | 12/1993 | Gueret | ................ | B05B 11/3032 137/854 |
| 5,320,253 A * | 6/1994 | Robinson | ............ | A01M 7/0085 137/854 |
| 5,893,707 A * | 4/1999 | Simmons | ............ | F04B 43/1136 417/393 |
| 5,975,360 A * | 11/1999 | Ophardt | ................ | A47K 5/1205 222/83 |
| 8,919,611 B2 * | 12/2014 | Ophardt | ............... | A47K 5/1207 222/181.3 |
| 2003/0198561 A1 * | 10/2003 | Watanabe | ............... | F04B 9/135 417/393 |
| 2004/0037722 A1 * | 2/2004 | Watanabe | ............. | F04B 43/084 417/473 |
| 2010/0286597 A1 | 11/2010 | Wang | | |
| 2014/0010689 A1 * | 1/2014 | Iwabuchi | ................ | F04B 43/10 417/472 |
| 2015/0071801 A1 | 3/2015 | De Regt | | |

FOREIGN PATENT DOCUMENTS

| | | |
|---|---|---|
| CN | 104066986 A | 9/2014 |
| JP | S45-33003 Y1 | 12/1970 |
| JP | S50-50706 A | 5/1975 |
| JP | S53-04569 A | 1/1978 |
| JP | S63-24467 U | 2/1988 |
| JP | H11-201045 A | 7/1999 |
| JP | 2006-200429 A | 8/2006 |
| JP | 2009-250363 A | 10/2009 |
| JP | 2012-211512 A | 11/2012 |
| JP | 2013-241885 A | 12/2013 |
| JP | 2014-051950 A | 3/2014 |
| WO | 2009/113804 A2 | 9/2009 |
| WO | 2013/135883 A1 | 9/2013 |

OTHER PUBLICATIONS

Apr. 5, 2016 Office Action issued in Japanese Patent Application No. 2016-501469.

Jun. 2, 2015 International Search Report issued in International Patent Application No. PCT/JP2015/056940.

* cited by examiner

VOLUME PUMP INCLUDING A BELLOWS AND A SUCTION VALVE AND A DISCHARGE VALVE WHEREIN THE VALVES COMPRISE A VALVE SEAT AND A VALVE BODY AND WHEREIN A FIXED SECTION OF THE VALVE BODY INCLUDES A COMMUNICATING FLOW PATH

TECHNICAL FIELD

The present invention relates to a volume pump that transfers a transfer fluid by changing a volume of an inside of a pump chamber by a deformable member such as a bellows or a diaphragm.

BACKGROUND ART

There is known a volume pump that transfers a transfer fluid by changing a volume of an inside of a pump chamber by a deformable member such as a bellows or a diaphragm. In this kind of volume pump, a suction valve is provided between a suction port and the pump chamber of the pump, and a discharge valve is provided between a discharge port and the pump chamber of the pump. Now, for example, Patent Document 1 listed below discloses a volume pump having a suction valve and a discharge valve that include: a cylindrical valve seat; and a valve body that slides along an inner wall of this cylindrical valve seat. Moreover, Patent Document 2 listed below discloses a volume pump having a suction valve and a discharge valve that include: a cylindrical valve seat; and a spherical valve body that slides along an inner wall of this valve seat.

PRIOR ART DOCUMENT

Patent Document

[Patent Document 1] JP 2012-211512 A
[Patent Document 2] JP 2006-200429 A

DISCLOSURE OF INVENTION

Problem to be Solved by the Invention

In both of the above-mentioned Patent Documents 1 and 2, the suction valve and the discharge valve have a sliding portion, and particles generated in this portion sometimes get mixed into the fluid.

The present invention was made in view of this kind of problem, and has an object of providing a volume pump capable of preventing particles generated from a sliding portion being mixed into a fluid.

Means for Solving the Problem

A volume pump according to one aspect of the present invention is a volume pump that transfers a transfer fluid by expanding and contracting a bellows. This volume pump includes: the bellows that is disposed so as to be capable of expanding and contracting, and has a bottomed cylindrical shape forming a pump chamber on its inside; a suction valve provided on a suction side of the pump chamber to guide the transfer fluid into the pump chamber; and a discharge valve provided on a discharge side of the pump chamber to discharge the transfer fluid from the pump chamber. In addition, the suction valve and the discharge valve each include a valve seat and a valve body. The valve body is configured from a flexible material and has: a fixed section whose positional relationship with the valve seat is fixed; and a valve section that extends in a certain direction between a direction directed from the fixed section to the valve seat and a direction that the transfer fluid moves.

That is, in this kind of volume pump, a valve section of a suction valve and a discharge valve is configured from a flexible material, a positional relationship of a valve seat and a fixed portion of the valve section is fixed, and, furthermore, a movable portion of the valve section extends in a certain direction between a direction extending from a valve body to the valve seat and a direction that a fluid moves. Therefore, it is possible to block a flow path by press-contacting the valve seat and the valve body, and it is possible to prevent sliding of the valve seat and the valve body along each other. Therefore, by utilizing this kind of suction valve and discharge valve in a volume pump such as a bellows pump that does not have a sliding portion inside its pump chamber, it is possible to prevent particles generated from the sliding portion from being mixed into the fluid.

Moreover, in a volume pump according to one aspect of the present invention, the valve seat of the suction valve is formed in a cylindrical shape projecting toward the pump chamber, and the valve section is formed in substantially a conical shape whose radius becomes larger along a direction that the transfer fluid moves.

Moreover, in a volume pump according to one aspect of the present invention, the valve seat of the discharge valve is formed in a cylindrical shape projecting toward the pump chamber, and the valve section is formed in substantially a conical shape whose radius becomes larger along a direction that the transfer fluid moves.

When the discharge valve is configured in this way, for example, the discharge valve may further include a valve body fixing member that fixes a positional relationship of the valve seat and the valve body. Moreover, the valve body fixing member may be formed in substantially a circular columnar shape having an axis whose position matches that of the valve seat, project toward the pump chamber, and include in an outer peripheral portion of an end section projecting into the pump chamber a portion fixed to the valve body. Note that "a portion fixed to the valve body" mentioned here refers to a male screw, for example.

Moreover, in this case, furthermore, the valve body of the discharge valve may further include an annular section formed in an annular shape having an axis whose position matches that of the valve seat and including in an inner peripheral portion a portion fixed to the valve body fixing member, and the valve section may be formed integrally with the annular section and extend in the certain direction from the annular section. Note that "a portion fixed to the valve body fixing member" mentioned here refers to a female screw, for example. In this case, by configuring the valve body fixing member from a material whose rigidity is higher compared to that of the valve section, for example, it is possible to prevent an axis of the valve body fixing member from bending due to the likes of a vortex occurring in a flow path, and to reduce a possibility that the valve body and the valve seat slide along each other.

Moreover, in the case that the valve seat of the discharge valve is formed in a cylindrical shape projecting toward the pump chamber, and the valve section is formed in substantially a conical shape whose radius becomes larger along a direction that the transfer fluid moves, for example, the discharge valve may further include a valve body fixing member that fixes a positional relationship of the valve seat and the valve body. Furthermore, the valve body may have a projecting section that projects toward the valve body fixing member, and a portion fixed to the valve body fixing member may be formed in an outer peripheral portion of the projecting section.

A volume pump according to one aspect of the present invention is a volume pump that transfers a transfer fluid by changing a volume of an inside of a pump chamber by a deformable member. This volume pump includes: a suction valve provided on a suction side of the pump chamber to guide the transfer fluid into the pump chamber; and a discharge valve provided on a discharge side of the pump chamber to discharge the transfer fluid from the pump chamber. The suction valve and the discharge valve each include a valve seat and a valve body. The valve body is configured from a flexible material and has: a fixed section whose positional relationship with the valve seat is fixed; and a valve section that extends in a certain direction between a direction directed from the fixed section to the valve seat and a direction in which the transfer fluid moves.

MODE FOR CARRYING OUT THE INVENTION

A volume pump according to an embodiment of the present invention will be described in detail below with reference to the drawings.

First Embodiment

Figure 1:
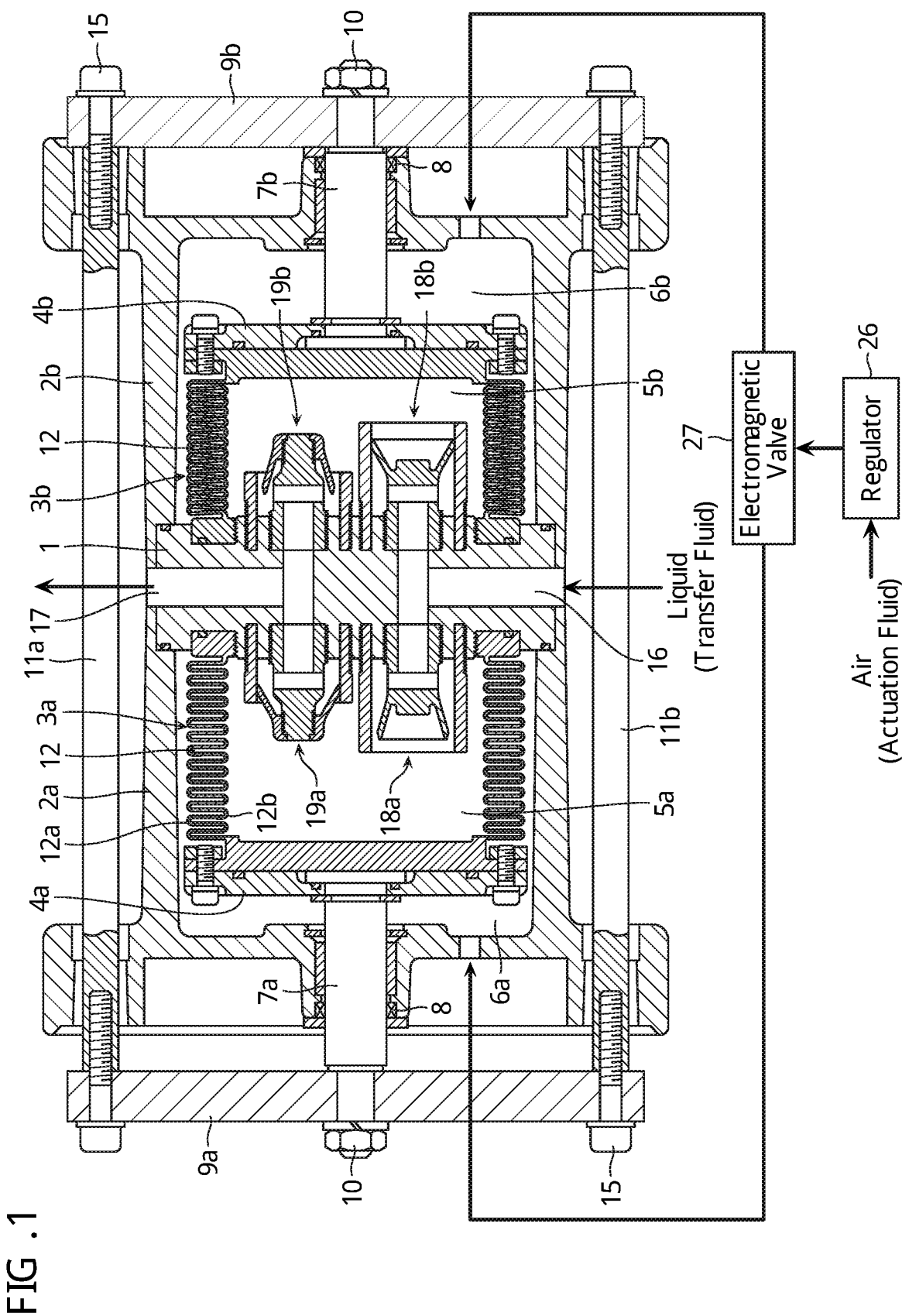
FIG. 1 is a cross-sectional view of a volume pump according to a first embodiment of the present invention.

FIG. 1 is a cross-sectional view of a bellows pump according to one embodiment of the present invention and a view showing a peripheral mechanism of the bellows pump. Note that although description will be made exemplifying as the bellows pump according to the present embodiment a so-called double-chamber type having a reciprocating pump structure, a so-called single-chamber type bellows pump may also be applied.

The bellows pump is configured as follows. Bottomed cylindrical cylinders 2a, 2b which are case members are coaxially disposed on both sides of a pump head 1 disposed in a central section, and a pair of spaces are formed on insides of the cylinders 2a, 2b. Bottomed cylindrical bellows 3a, 3b are respectively coaxially disposed inside these spaces.

Opening ends of the bellows 3a, 3b are fixed to the pump head 1, and shaft fixing plates 4a, 4b are fixed to bottom sections of the bellows 3a, 3b. The bellows 3a, 3b are configured from a fluororesin, for example, and internal spaces of the cylinders 2a, 2b are partitioned assuming inner sides of the bellows 3a, 3b to be pump chambers 5a, 5b and outer sides of the bellows 3a, 3b to be actuation chambers 6a, 6b. Moreover, the bellows 3a, 3b include crest parts 12a and trough parts 12b that are formed alternately along axial directions of the bellows 3a, 3b.

One ends of coaxially extending shafts 7a, 7b are fixed to the shaft fixing plates 4a, 4b. The other ends of the shafts 7a, 7b respectively penetrate, in an airtight manner, via seal members 8, centers of bottom sections of the cylinders 2a, 2b, thereby extending to outer sides of the cylinders 2a, 2b. Coupling plates 9a, 9b are fixed by nuts 10 to these other ends of the shafts 7a, 7b.

The coupling plates 9a, 9b are coupled by coupling shafts 11a, 11b at positions above and below the cylinders 2a, 2b. The coupling shafts 11a, 11b are each fixed to the coupling plates 9a, 9b by bolts 15.

A suction port 16 and a discharge port 17 of a transfer fluid are provided in the pump head 1 at positions facing side surfaces of the pump. Along with this, suction valves 18a, 18b are provided in the pump head 1 at positions reaching from the suction port 16 to the pump chambers 5a, 5b, and discharge valves 19a, 19b are provided in the pump head 1 in pathways reaching from the pump chambers 5a, 5b to the discharge port 17.

On the other hand, an actuation fluid, for example, air, from an actuation fluid source such as an unillustrated air compressor is respectively limited to a certain pressure by a regulator 26 to be supplied to an electromagnetic valve 27.

It is assumed that the actuation chamber 6a is in an exhaust state and the actuation chamber 6b is in an air introduction state, and that the pump chamber 5a is in an expansion process and the pump chamber 5b is in a contraction process. At this time, since the suction valve 18a and the discharge valve 19b are in an open state, and the suction valve 18b and the discharge valve 19a are in a closed state, a liquid to be transferred is introduced into the pump chamber 5a from the suction port 16, and discharged via the discharge port 17 from the pump chamber 5b.

Figure 2:
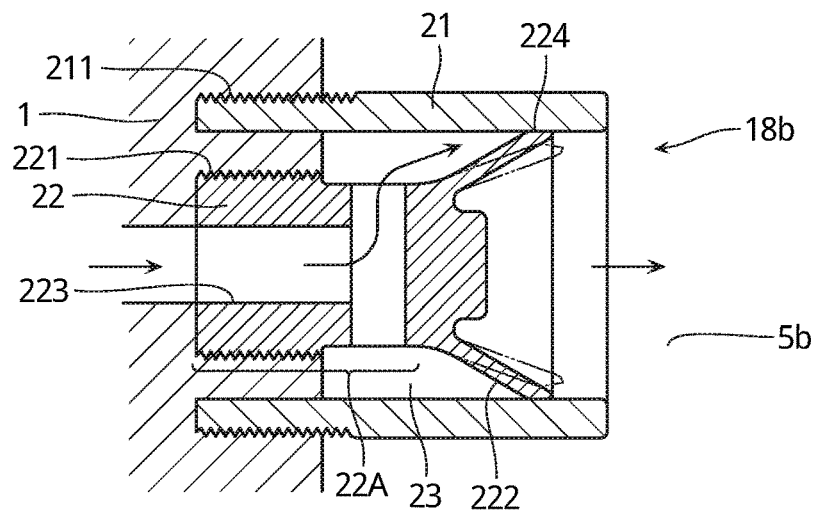
FIG. 2 is a cross-sectional view showing a configuration example of a suction valve of the same volume pump.

Next, the suction valve 18b will be described in more detail with reference to FIG. 2. FIG. 2 is a cross-sectional view of the suction valve 18b. Note that although the suction valve 18b is exemplified in FIG. 2, the suction valve 18a is also configured similarly to the suction valve 18b.

As shown in FIG. 2, the suction valve 18b includes a valve seat 21 and a valve body 22 that are screwed into the pump head 1 and project into the pump chamber 5b from the pump head 1. The valve seat 21 is formed in a cylindrical shape, as an example. Moreover, a screw section (male screw) 211 is formed in an outer peripheral portion of one end of the valve seat 21, and the valve seat 21 is screwed into a female screw of the pump head 1 by this screw section 211.

The valve body 22 is configured from a flexible material such as a fluororesin, and, as an example, is formed in substantially a circular columnar shape having an axis whose position matches that of the valve seat 21. A screw section (male screw) 221 is formed in an outer peripheral portion of one end of the valve body 22, and the one end of the valve body 22 is screwed into a female screw of the pump head 1 by this screw section 221. In addition, the other end of the valve body 22 has a valve section 222 formed in substantially a conical shape (horn shape) whose radius is larger the further a portion of the valve section 222 is from the pump head 1. In other words, the valve section 222 has substantially a conical shape whose radius becomes larger along a direction that the transfer fluid moves. That is, as shown in FIG. 2, the valve section 222 is coupled to a main body 22A (fixed section) of the valve body 22 formed in a circular columnar shape, and a conical shaped section of the valve section 222 is formed so as to extend broadening gradually from the main body 22A toward an inner wall of the valve seat 21 and such that a tip of the conical shaped section press-contacts the inner wall. Furthermore, a suction flow path 223 that communicates the suction port 16 of the pump head 1 and a space 23 between the valve seat 21 and the valve body 22, is formed in the valve body 22.

When the pump chamber 5b is in the expansion process, a fluid 16 introduced from the suction port 16 is introduced into the space 23, via the suction flow path 223, and the valve section 222 is pressed by the fluid. Now, the valve body 22 is configured from a flexible material. Moreover, the valve section 222 is coupled to the main body of the valve body 22 formed in a circular columnar shape, and is formed so as to extend broadening gradually from the main body 22A toward an inner wall of the valve seat 21 and such that a tip of the valve section 222 press-contacts the inner wall. Therefore, when the valve section 222 is pressed by the fluid in the space 23, the valve section 222 deforms by being pressed by a flow along with the fluid, and a tip portion 224 of the valve section 222 and an inner wall portion separate. As a result, the space 23 communicates with the pump chamber 5b, and the fluid is introduced into the pump chamber 5b.

On the other hand, when the pump chamber 5b is in the contraction process, the valve section 222 is pressed by the fluid in the pump chamber 5b. Now, the valve body 22 is configured from a flexible material. Moreover, the valve section 222 is coupled to the main body of the valve body 22 formed in a circular columnar shape, and is formed so as to extend broadening gradually from the main body 22A toward an inner wall of the valve seat 21 and such that a tip of the valve section 222 press-contacts the inner wall. Therefore, when the valve section 222 is pressed by the fluid in the pump chamber 5b, the valve section 222 is broadened out toward the inner wall portion of the valve seat 21, and the tip portion of the valve section 222 and the inner wall portion of the valve seat 21 make contact. As a result, the space 23 and the pump chamber 5b are partitioned, and the fluid is prevented from being introduced into the space 23 from the pump chamber 5b.

Figure 3:
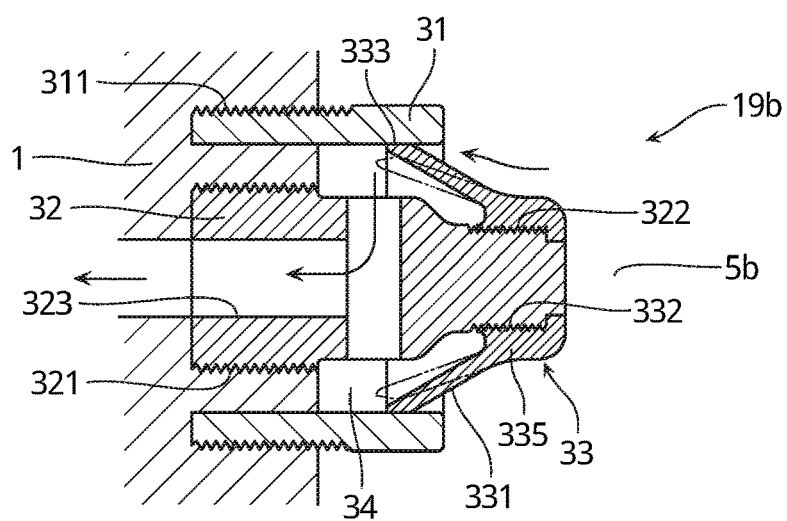
FIG. 3 is a cross-sectional view showing a configuration example of a discharge valve of the same volume pump.

Next, the discharge valve 19b will be described in more detail with reference to FIG. 3. FIG. 3 is a cross-sectional view of the discharge valve 19b. Note that although the discharge valve 19b is exemplified in FIG. 3, the discharge valve 19a is also configured similarly to the discharge valve 19b.

As shown in FIG. 3, the discharge valve 19b includes: a valve seat 31 and a valve body fixing member 32 that are screwed into the pump head 1 and project into the pump chamber 5b from the pump head 1; and a valve body 33 coupled to this valve body fixing member 32. The valve seat 31 is formed in a cylindrical shape, as an example. Moreover, a screw section (male screw) 311 is formed in an outer peripheral portion of one end of the valve seat 31, and the valve seat 31 is screwed into a female screw of the pump head 1 by this screw section 311.

The valve body fixing member 32 is formed in substantially a circular columnar shape having an axis whose position matches that of the valve seat 31, as an example. A screw section (male screw) 321 is formed in an outer peripheral portion of one end of the valve body fixing member 32, and the valve body fixing member 32 is screwed into a female screw of the pump head 1 by this screw section 321. In addition, a screw section (male screw) 322 is formed in an outer peripheral portion of the other end of the valve body fixing member 32, and the valve body fixing member 32 is screwed into the valve body 33 by this screw section 322. Furthermore, a discharge flow path 323 that communicates the discharge port 17 of the pump head 1 and a space 34 between the valve seat 31 and the valve body fixing member 32, is formed in the valve body fixing member 32.

The valve body 33 is configured from a flexible material such as a fluororesin. Moreover, as an example, the valve body 33 includes an annular section 335 formed in an annular shape having an axis whose position matches that of the valve seat 31 and having formed in an inner peripheral portion a screw section (female screw) 332 (fixed section) screwed into by the screw section 322 of the valve body fixing member 32. That is, the valve body 33 is screwed into the valve body fixing member 32 by this screw section 332. In addition, the valve body 33 configures a valve section 331 formed integrally with this annular section 335 and formed in substantially a conical shape (horn shape) whose radius is larger the closer the pump head 1 is approached. In other words, the valve section 331 has substantially a conical shape whose radius becomes larger along a direction that the transfer fluid moves. That is, as shown in FIG. 3, the valve section 331 is formed so as to extend broadening gradually from the valve body fixing member 322 toward an inner wall of the valve seat 31 and such that a tip of the valve section 331 press-contacts the inner wall.

When the pump chamber 5b is in the expansion process, the inside of the pump chamber 5b attains a reduced pressure state, and the valve body 33 is pulled to the inside of the pump chamber 5b. Now, the valve body 33 is configured from a flexible material. Moreover, the valve section 331 is coupled to the valve body fixing member 32 formed in a circular columnar shape, and is formed so as to extend broadening gradually from the valve body fixing member 332 toward an inner wall of the valve seat 31 and such that a tip of the valve section 331 press-contacts the inner wall. Therefore, when the valve body 33 is pulled to the inside of the pump chamber 5b, the valve section 331 is broadened out toward the inner wall portion of the valve seat 31, and a tip portion 333 of the valve section 331 and the inner wall portion of the valve seat 31 make contact. As a result, the space 34 and the pump chamber 5b are partitioned, and the fluid is prevented from being introduced into the pump chamber 5b from the space 34.

On the other hand, when the pump chamber 5b is in the contraction process, the valve section 331 is pressed by the fluid in the pump chamber 5b. Now, the valve body 33 is configured from a flexible material. Moreover, the valve section 331 is coupled to the valve body fixing member 32 and is formed so as to extend broadening gradually from the valve body fixing member 322 toward an inner wall of the valve seat 31 and such that a tip of the valve section 331 press-contacts the inner wall. Therefore, when the valve section 331 is pressed by the fluid in the pump chamber 5b, the tip portion 333 of the valve section 331 is pressed by a flow, along with the fluid, and the tip portion 333 of the valve section 331 and the inner wall portion of the valve seat 31 separate. As a result, the space 34 communicates with the pump chamber 5b, and the fluid is discharged into the discharge port 17 from the pump chamber 5b.

That is, in the volume pump according to the present embodiment, the valve section is configured from a flexible material, a positional relationship of the valve seat and a fixed portion of the valve section is fixed, and, furthermore, a movable portion of the valve section extends in a certain direction between a direction extending from the valve body to the valve seat and a direction that the fluid moves. Therefore, it is possible to block a flow path by press-contacting the valve seat and the valve body, and it is possible to prevent sliding of the valve seat and the valve body along each other. Therefore, by utilizing the suction valve and the discharge valve according to the present embodiment in a volume pump such as a bellows pump or a diaphragm pump that does not have a sliding portion inside its pump chamber, it is possible to prevent particles generated from the sliding portion from being mixed into the fluid.

Moreover, in the discharge valve 19b according to the present embodiment, as shown in FIG. 3, the valve body fixing member 32 is formed in a circular columnar shape, and has the screw section 322 formed in an outer peripheral portion of its end section. Moreover, in the present embodiment, the valve body 33 includes the annular section 335 formed in an annular shape having an axis whose position matches that of the valve seat 31 and having formed in an inner peripheral portion a screw section (female screw) 332 screwed into by the screw section 322 of the valve body fixing member 32. In addition, the valve section 331 is formed integrally with this annular section 335 and extends in the above-described certain direction from this annular section 335. Therefore, by, for example, configuring the valve body fixing member 32 from a material whose rigidity is high to a certain extent or more, it is possible to prevent an axis of the valve body fixing member 32 from bending due to the likes of a vortex occurring in a flow path, and to reduce a possibility that the valve body 33 and the valve seat 31 slide along each other. In this case, rigidity of a material used in the valve body fixing member 32 is at least larger than rigidity of a material used in the valve body 33.

Another Configuration Example

Figure 4:
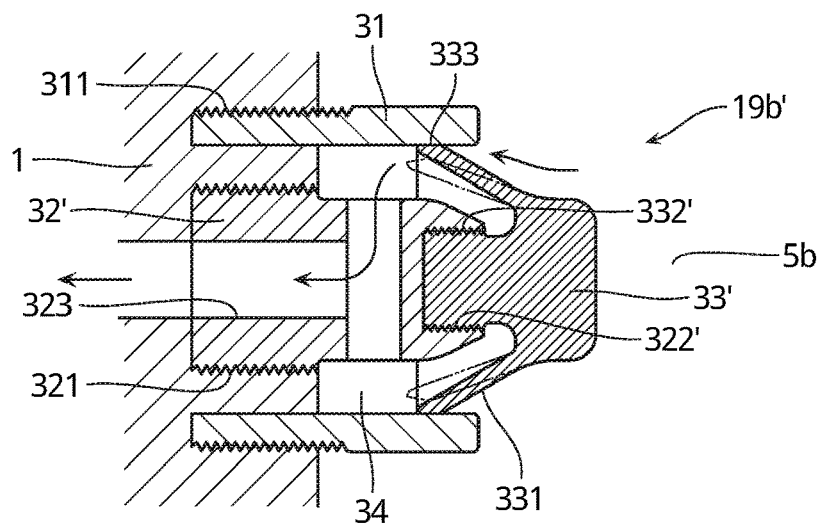
FIG. 4 is a cross-sectional view showing another configuration example of the discharge valve of the same volume pump.

In the example shown in FIG. 3, the screw section 322 of the valve body fixing member 32 was configured as a male screw, and the screw section 332 of the valve body 33 was configured as a female screw. However, for example, as shown in FIG. 4, a screw section 322' of a valve body fixing member 32' may be configured as a male screw, and a screw section 332' (fixed section) of a valve body 33' may be configured as a female screw. Note that, in other respects, a discharge valve 19b' shown in FIG. 4 is configured similarly to the discharge valve 19b shown in FIG. 3.

Figure 5:
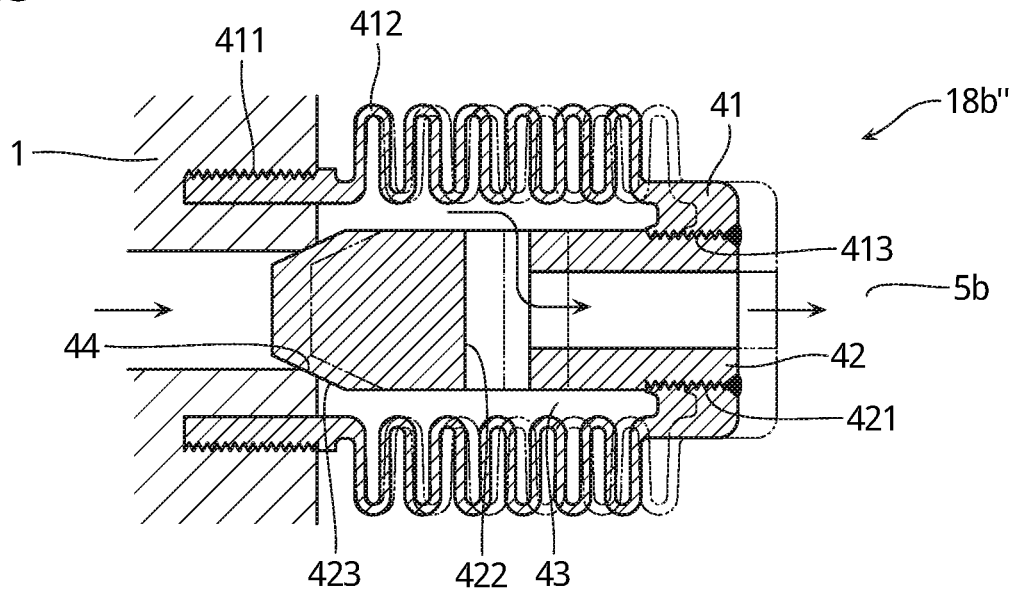
FIG. 5 is a cross-sectional view showing a configuration example of a suction valve of a volume pump according to another configuration example.
Figure 6:
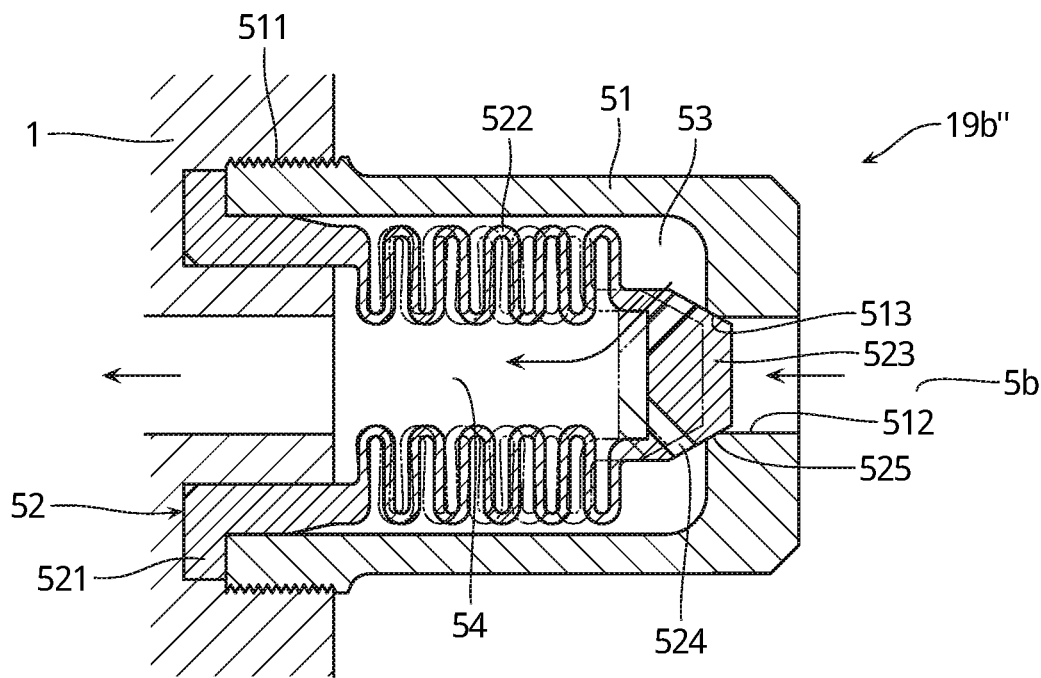
FIG. 6 is a cross-sectional view showing a configuration example of a discharge valve of the same volume pump.

Moreover, in the sense of preventing sliding of the valve seat and the valve body along each other, it is also conceivable for the suction valve and the discharge valve to be configured as shown in, respectively, FIGS. 5 and 6. FIG. 5 is a cross-sectional view of a suction valve 18b" according to another configuration example. FIG. 6 is a cross-sectional view of a discharge valve 19b" according to the another configuration example. Note that even in the examples shown in FIGS. 5 and 6, configurations other than the suction valve and the discharge valve are configured similarly to configurations described with reference to FIG. 1.

As shown in FIG. 5, the suction valve 18b" according to the another configuration example includes: a valve body 42 where the pump head 1 functions as the valve seat; and a valve body holding member 41 which is configured from a flexible material and holds part of the valve body 42 movably with respect to the pump head 1. The valve body holding member 41 is formed in substantially a cylindrical shape, and includes in an outer peripheral portion of its one end a coupling section (male screw) 411 to the pump head 1, in an inner peripheral portion of its other end a coupling section (female screw) 413 to the valve body 42, and in a portion between these coupling sections a bellows section 412.

In addition, as shown in FIG. 5, the valve body 42 is configured in substantially a circular columnar shape extending from the coupling section 413 of the valve body holding member 41 toward the pump head 1. Moreover, the valve body 42 has in an outer peripheral portion of its one end a coupling section (male screw) 421 to the valve body holding member 41, and in its other end an abutting portion 423 on the pump head 1. As shown in FIG. 5, in the abutting portion 423 on the pump head 1, a radius of the valve body 42 decreases gradually in a direction running counter to a flow path. Moreover, a flow path 422 that communicates a space 43 between the valve body holding member 41 and the valve body 42 and the pump chamber 5b, is formed in the valve body 42.

As shown in FIG. 6, the discharge valve 19b" according to the another configuration example includes: a valve seat 51 screwed into the pump head 1 and projecting into the pump chamber 5b from the pump head 1; and a valve body 52 anchored by the pump head 1 and the valve seat 51 and projecting into a space 53 partitioned by the valve seat 51 and the pump head 1. The valve seat 51 is formed in substantially a bottomed cylindrical shape. In addition, a screw section (male screw) 511 is formed in an outer peripheral portion of one end of the valve seat 51, and the valve seat 51 is screwed into a female screw of the pump head 1 by this screw section 511. Furthermore, a flow path 512 that communicates the space 53 partitioned by the valve seat 51 and the pump head 1 and the pump chamber 5b, is formed in a bottom section of the valve seat 51. Furthermore, an abutting portion 513 on the valve body 52 is provided in the valve seat 51. This abutting portion 513 is positioned in a boundary portion of the flow path 512 and the bottom section of the valve seat 51.

As shown in FIG. 6, the valve body 52 is configured from a flexible material, and is formed in substantially a bottomed cylindrical shape having an axis whose position matches that of the valve seat 51. In addition, the valve body 52 has in its one end an anchored section 521 anchored by the pump head 1 and the valve seat 51, and has an abutting section 525 that abuts on the valve seat 51 in a bottom section 523 positioned in its other end. Moreover, the valve body 52 has a bellows section 522 in a portion between the anchored section 521 and the abutting section 525. A flow path 524 that communicates a space 54 in the valve body 52 and the space 53 partitioned by the valve seat 51 and the pump head 1, is formed in the bottom section 523 of the valve body 52. Moreover, in the abutting section 525 on the valve seat 51, a radius of the bottom section 523 decreases gradually in a direction running counter to a flow path.

Moreover, provided it is a volume pump that does not have a sliding portion in its pump chamber, the present invention may also be applied to a pump other than a bellows pump. For example, a diaphragm pump may be cited as such a volume pump.

DESCRIPTION OF REFERENCE NUMERALS

| | |
|---|---|
| 1 | pump head |
| 2a, 2b | cylinder |
| 3a, 3b | bellows |
| 5a, 5b | pump chamber |
| 6a, 6b | actuation chamber |
| 11a, 11b | coupling shaft |
| 16 | suction port |
| 17 | discharge port |

-continued

| 18a, 18b | suction valve |
| 19a, 19b | discharge valve |
| 21, 31 | valve seat |
| 22, 33 | valve body |
| 222, 331 | valve section |

The invention claimed is:

1. A volume pump that transfers a transfer fluid, the volume pump comprising:
 a pump head including a suction port of the transfer fluid and a discharge port of the transfer fluid;
 a bellows fixed to the pump head, the bellows being configured to expand and contract to transfer the transfer fluid, and the bellows has a bottomed cylindrical shape forming a pump chamber on an inside of the bellows;
 a suction valve provided on the pump head to guide the transfer fluid from the suction port to the pump chamber; and
 a discharge valve provided on the pump head to guide the transfer fluid from the pump chamber to the discharge port, wherein:
  each of the suction valve and the discharge valve includes a valve seat and a valve body,
  each valve body is formed of a flexible material and includes: (i) a fixed section having a fixed positional relationship with the valve seat, and (ii) a valve section extending in a certain direction between a direction directed from the fixed section to the valve seat and a direction that the transfer fluid moves,
  an end of the fixed section of each valve body is screwed into the pump head, and
  the fixed section of each valve body includes a flow path communicating one of either the suction port or the discharge port, and a space between the valve seat and the valve body.

2. The volume pump described in claim 1, wherein:
 the valve seat of the suction valve is formed in a cylindrical shape projecting toward the pump chamber, and
 the valve section is formed in a conical shape having a radius that increases along a direction that the transfer fluid moves.

3. The volume pump described in claim 1, wherein:
 the valve seat of the discharge valve is formed in a cylindrical shape projecting toward the pump chamber, and
 the valve section is formed in a conical shape having a radius that increases along a direction that the transfer fluid moves.

4. The volume pump described in claim 3, wherein:
 the fixed section of the discharge valve body includes a valve body fixing member that fixes a positional relationship of the valve seat and the valve body, and
 the valve body fixing member (i) is formed in a circular columnar shape having an axis with a position that matches a position of the valve seat, (ii) projects toward the pump chamber, and (iii) includes a portion fixed to the valve body in an outer peripheral portion of an end section projecting into the pump chamber.

5. The volume pump described in claim 4, wherein:
 the valve body of the discharge valve includes an annular section formed in an annular shape having an axis with a position that matches a position of the valve seat, the annular section including a portion fixed to the valve body fixing member in an inner peripheral portion, and the valve section is formed integrally with the annular section and extends in the certain direction from the annular section.

6. The volume pump described in claim 3, wherein:
 the fixed section of the discharge valve body includes a valve body fixing member that fixes a positional relationship of the valve seat and the valve body, and
 the valve body has a portion screwed into the valve body fixing member.

7. A volume pump that transfers a transfer fluid by changing a volume of an inside of a pump chamber by deforming a deformable member, the volume pump comprising:
 a pump head including a suction port of the transfer fluid and a discharge port of the transfer fluid;
 a suction valve provided on the pump head to guide the transfer fluid from the suction port to the pump chamber; and
 a discharge valve provided on the pump head to guide the transfer fluid from the pump chamber to the discharge port, wherein:
  each of the suction valve and the discharge valve includes a valve seat and a valve body, and
  each valve body is formed of a flexible material and includes: (i) a fixed section having a fixed positional relationship with the valve seat, and (ii) a valve section extending in a certain direction between a direction directed from the fixed section to the valve seat and a direction that the transfer fluid moves,
  an end of the fixed section of each valve body is screwed into the pump head, and
  the fixed section of each valve body includes a flow path communicating one of either the suction port or the discharge port, and a space between the valve seat and the valve body.

8. The volume pump described in claim 2, wherein:
 the valve seat of the discharge valve is formed in a cylindrical shape projecting toward the pump chamber, and
 the valve section is formed a conical shape having a radius that increases along a direction that the transfer fluid moves.

9. The volume pump described in claim 8, wherein:
 the fixed section of the discharge valve body includes a valve body fixing member that fixes a positional relationship of the valve seat and the valve body, and
 the valve body fixing member (i) is formed in a circular columnar shape having an axis with a position that matches a position of the valve seat, (ii) projects toward the pump chamber, and includes a portion fixed to the valve body in an outer peripheral portion of an end section projecting into the pump chamber.

10. The volume pump described in claim 9, wherein:
 the valve body of the discharge valve includes an annular section formed in an annular shape having an axis with a position that matches a position of the valve seat, the annular section including a portion fixed to the valve body fixing member in an inner peripheral portion, and
 the valve section is formed integrally with the annular section and extends in the certain direction from the annular section.

11. The volume pump described in claim 8, wherein:
 the fixed section of the discharge valve body includes a valve body fixing member that fixes a positional relationship of the valve seat and the valve body, and
 the valve body has a portion screwed into the valve body fixing member.

\* \* \* \* \*